United States Patent Office 3,354,350
Patented Nov. 21, 1967

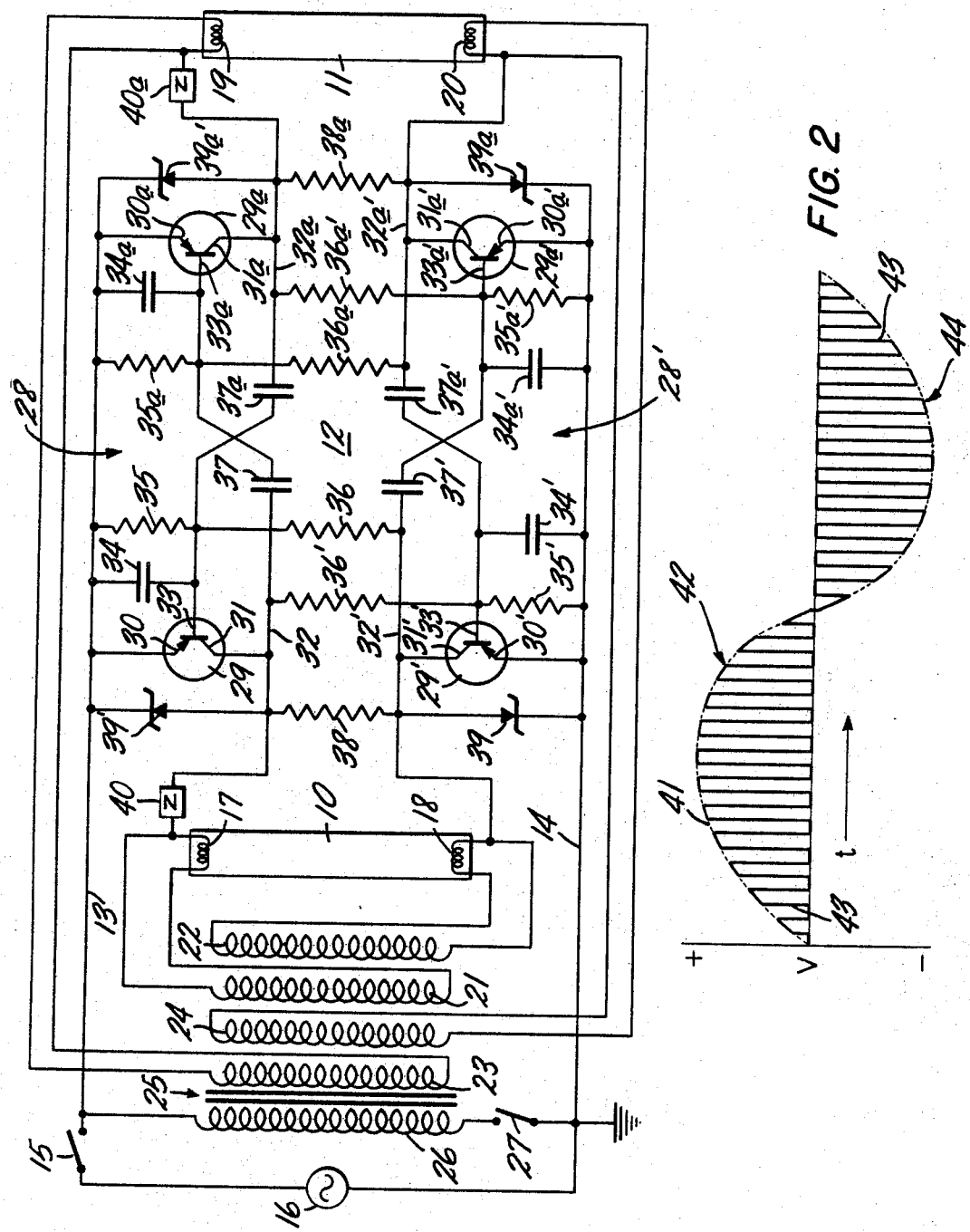

3,354,350
TWO ALTERNATE CONDUCTING MULTI-
VIBRATORS POWERED BY AC SOURCE
George Andrew Kappenhagen, Parma, and Robert James
Avalon, Burton, Ohio, assignors to The Ohio Crank-
shaft Company, Cleveland, Ohio, a corporation of Ohio
Filed Oct. 27, 1964, Ser. No. 406,766
10 Claims. (Cl. 315—205)

ABSTRACT OF THE DISCLOSURE

In the particular embodiment of the invention described herein, two fluorescent lamps are connected between two multivibrators across an alternating current source. The multivibrators comprise transistor circuits operating at high frequency and are arranged to conduct during opposite halves of the alternating current cycle, each transistor being shunted by a zener diode to permit bypass conduction when the corresponding multivibrator is inactive.

---

This invention relates to multivibrators of the free-running type and, more particularly, to a new and improved free-running multivibrator arranged to convert an alternating current voltage to a high frequency voltage to provide a high frequency free-running power supply especially adapted for use at the site of a load and as, for example, an induction heating or welding unit or a resistance heating unit, or for certain loads such as fluorescent lamps which are energized more efficiently at high frequencies.

Heretofore, the conversion of alternating current power to high frequency power for use with loads requiring high frequencies has usually been accomplished by rectifying the alternating current power and then generating from the resulting direct current power a high frequency alternating current voltage. Consequently, conventional high frequency power supplies for induction heating units, welding units and the like have been characterized by considerable size and complexity and relatively high cost. Moreover, because of the cost and complexity of conventional high frequency power supplies and since substantial power losses are encountered if power is transmitted at high frequency from the point of generation to a remote place of consumption, electrical components such as fluorescent lamps which operate more efficiently with high frequency power have not been energized at high frequency but, instead, have used line frequency current which is supplied through a separate transformer or ballast for each lamp or fixture.

Accordingly, it is an object of the present invention to provide a new and improved high frequency power supply characterized by its small size, low cost and simplicity of arrangement.

Another object of the present invention is to provide a new and improved frequency converter capable of overcoming the above-mentioned shortcomings and disadvantages of present conversion systems.

Yet another object of the invention is to provide a new and improved multivibrator which may be utilized to accomplish frequency conversion in a simple and effective manner.

A further object of the invention is to provide a multivibrator of the above character whereby frequency conversion is accomplished without rectification of the original alternating current.

An additional object of the invention is to provide a new and improved high frequency power supply for induction heaters, fluorescent lamps and the like whereby more efficient operation is obtained.

Still another object of the invention is to provide a high frequency voltage supply for fluorescent lamps which eliminates the need for a transformer-type ballast.

These and other objects of the invention are attained by providing an electronic switch which is adapted to be connected to a conventional alternating current supply, a unidirectional conductor device shunting the switch, a circuit arranged to control the operation of the switch at a selected frequency greater than the alternating current frequency, and an output device to supply voltage at the selected frequency. Preferably, the switch comprises a multivibrator arranged to conduct current in one direction at the selected frequency and, in a particular embodiment, two multivibrators, arranged to conduct in opposite directions, are connected between the opposite ends of an output circuit which includes a device to be energized, such as a fluorescent lamp.

Further objects and advantages of the invention will be apparent from a reading of the following description in conjunction with the accompanying drawings, in which:

FIG. 1 is a schematic circuit diagram illustrating a representative frequency converter multivibrator connected to supply high frequency voltage to a pair of fluorescent lamps in accordance with the invention; and FIG. 2 is a graphical representation of an output voltage waveform produced by the multivibrator frequency converter according to the invention.

In the typical circuit arrangement illustrated schematically in FIG. 1, two fluorescent lamps 10 and 11 are supplied with high frequency voltage by a frequency converter 12 which is connected to receive power from two conductors 13 and 14 joined through an on-off switch 15 to a conventional alternating current power supply 16 providing, for example, 120 volts at a frequency of 60 cycles per second. The fluorescent lamps 10 and 11 shown in the drawings are of the type having heater filaments 17, 18, 19 and 20 at each end which are heated to initiate lamp operation and, in the representative system described herein, these filaments may be momentarily energized from corresponding secondary windings 21, 22, 23 and 24 of a small transformer 25 having its primary winding 26 connected across the conductors 13 and 14 by a switch 27. It will be understood, of course, that other conventional lamp starting arrangements such as a switch connecting the filaments for each lamp in series across the output of the frequency converter 12 may be used with the invention and that, in certain instances, the fluorescent lamps may be started directly from the frequency converter output without requiring filament heating.

Within the frequency converter 12, two multivibrator circuits 28 and 28' are arranged to supply high frequency power to the opposite ends, respectively, of the lamps 10 and 11 during successive halves of the voltage cycle of the 60 cycle alternating current supplied through the conductors 13 and 14. Inasmuch as the multivibrator circuits 28 and 28' are, in the illustrated embodiment, identical in all respects, only the circuit 28 will be described in detail herein, corresponding components of the circuit 28' being designated by primed reference numerals. In the multivibrator circuit 28, a first stage switch comprises an electron valve such as a transistor 29 having its emitter electrode 30 connected directly to the conductor 13 and its collector electrode 31 joined to an output conductor 32. In addition, the base electrode 33 is connected to the conductor 13 by an emitter bias circuit comprising a parallel capacitor 34 and resistor 35 and to a conductor 32' of the circuit 28' by a resistor 36. As will be described in detail hereinafter, the conductor 32' is held at approximately the same potential as the other input conductor 14 during the operation of the multivibrator 28. The conductor 32, moreover, is connected to the base electrode 33a of a transistor 29a in the second stage of the multivibrator 28 through an appropriate capacitor 37. To complete the circuit for the transistor 29, the conductor 32 is also connected through a resistor 38 to the conductor 32′ which, in turn, is connected to the other input line 14 by a diode rectifier 39.

Typically, the operating load, represented in the described embodiment by the fluorescent lamps 10 and 11, is connected in parallel with the resistors 38 and 38a, respectively, and, in certain cases, it may be desirable to include an additional low loss impedance (Z) designated by the characters 40 and 40a, respectively, in series with the load so as to limit the current drawn thereby during operation. The value and character of this impedance will depend, of course, upon the nature and characteristics of the load and, in a representative circuit supplying fluorescent lamps with high frequencies, a choke having an inductance of a few millihenries was provided.

Inasmuch as the second stage switch of the multivibrator 28 is identical to the first stage described above, its arrangement will not be described in detail but the elements thereof are designated in the drawing with corresponding reference numerals followed by the letter a, the base electrode 33 of the first stage being connected to the capacitor 37a of the second stage.

Preferably, the capacitance values of the two linking capacitors 37 and 37a of the multivibrator 28 are identical and those values, in conjunction with the resistance values of the resistors 36 and 36a, which should also be identical, determine the operating frequency of the multivibrator 28. On the other hand, the capacitance of the capacitors 34 and 34a and the resistance of the resistors 35 and 35a in the emitter bias circuits are selected in accordance with the transistor characteristics to maintain proper biasing conditions to provide optimum switching conditions and, therefore, produce an optimum output wave form. In this connection, the transistors 29 and 29a are both preferably of the same type and, if desired, NPN-type transistors may be substituted for the PNP-type transistors illustrated in the drawings, in which case the polarity of the diodes 39, 39a, 39′ and 39a′ should be reversed. For example, transistors of the type designated 2N1304, 2N1305, 2N1306, 2N1307, 2N2218, TA2458 and TA2470 have been found to be suitable for use in the type of circuit arrangement illustrated in the drawings.

Furthermore, it will be noted that the diodes 39, 39a, 39′ and 39a′ not only complete the circuit from the resistors 38 and 38a to the conductor 14 for the transistors 29 and 29a and to the conductor 13 for the transistors 29′ and 29a′, respectively, but they also provide a current by-pass for those transistors which they shunt, thereby protecting the transistors from application of any reverse voltage. Consequently, utilization of the multivibrator circuit is not limited by the reverse voltage breakdown characteristic of the transistors which are used. Furthermore, as illustrated in the drawing, the diodes 39, 39a, 39′ and 39a′ are preferably of the Zener type and the reverse breakdown voltage is selected to be slightly less than the forward voltage values which might cause damage to or breakdown of the transistors across which they are connected. In this way, any forward voltage surges which may be produced, for example, by the load which is connected to the circuit are by-passed through the Zener diodes and cannot damage the transistors.

Considering first the operation of the multivibrator 28 only, assume that the alternating 60 cycle voltage of the conductor 13 with the switch 15 closed, which is represented by the dotted line 41 in the graphical illustration of FIG. 2, is in the positive half cycle 42 as shown at the left-hand side of that figure. In addition, for purposes of illustration, it will be assumed that the transistor 29 starts conducting current before the transistor 29a. Inasmuch as the diodes 39 and 39a are conductive during the positive half cycle 42 of the voltage wave on the conductor 13, the conductors 32′ and 32a′ may be considered to be at the same potential as the line 14. As soon as the transistor 29 begins to conduct, positive voltage on the conductor 32 produced as a result of the current drawn through the resistor 38 causes a negative voltage to be applied by the capacitor 37 to the base electrode 33a of the second stage transistor 29a, thereby maintaining that transistor momentarily in the non-conductive condition in the usual manner. In FIG. 2, the instantaneous potential of the conductor 32 and thus the voltage appearing across the resistor 38 is represented graphically by the solid line 43.

When the charge on the capacitor 37 has dissipated through the resistor 36a, the transistor 29a becomes conductive and the positive potential on the conductor 32a produces a potential at the base electrode 33 which shuts off the transistor 29, thereby reducing the voltage through the resistor 38 to zero as indicated by the graph 43. This alternate operation of the first and second stage transistors 29 and 29a of the free-running multivibrator 28 continues at high frequency throughout the positive half cycle 42 of the voltage on the conductor 13. As a result, the instantaneous voltage across the resistor 38 throughout that half cycle continues to alternate at high frequency between the potential of the conductor 13, which is represented by the dotted line 41 in FIG. 2, and zero as shown by the solid line 43. During the same half cycle, the instantaneous voltage (not represented in FIG. 2) across the resistor 38a complements that of the resistor 38, being at the magnitude of the line 41 when the solid line 43 is at zero and being zero when the line 43 is at a positive level. Although, for convenience of illustration, an output frequency only about twenty-five times that of the input frequency is illustrated in FIG. 2, it will be understood that, by appropriate selection of component values, frequencies up to the megacycle range or higher may be produced by the frequency converter power supply of the invention.

After the alternating current input voltage reverses and the conductor 13 becomes negative, the diodes 39′ and 39a′ are rendered conductive, thereby shorting out the transistors 29 and 29a, and, at the same time, the diodes 39 and 39a become non-conductive, permitting the two stages of the multivibrator 28′ to operate at high frequency in the manner just described with respect to the multivibrator 28. During this half of the operating cycle, the voltage across the resistors 38 and 38a is reversed, as is indicated with respect to the resistor 38 by the right-hand half 44 of the wave form shown in FIG. 2. Accordingly, even during the portion of the input voltage cycle in which a multivibrator is operative, each transistor therein is conductive only half of the time and, since each transistor is completely at rest during the portion of the input voltage cycle in which its multivibrator is inactive, the overall duty cycle for each transistor is only 25%. Furthermore, since the transistors are mounted on a heat sink of considerable mass in a practical embodiment, they will rapidly lose any heat which may have been generated by the current drawn through them during the conductive half of the input voltage cycle. As a result of this arrangement, therefore, considerably greater instantaneous current loads may be drawn through the transistors than would be possible if they were operated continuously or for a greater percentage of the time.

In a representative operating embodiment of the invention, the resistors 38 and 38a each had a value of 5,000 ohms, the resistors 36, 36a, 36′ and 36a′ each had a value of 5,000 ohms, the resistors 35, 35a, 35′ and 35a′ had resistances of 10,000 ohms, the capacitors 34, 34a, 34′ and 34a′ had values of 0.1 microfarad and the capacitors 37, 37a, 37′ and 37a′ each had a capacitance of 0.022 microfarad. With this arrangement, an output voltage having a frequency in the neighborhood of 10,000 cycles was produced and was used to operate two 40-watt fluorescent lamps, each of the various types of transistors previously mentioned having been included in the circuit. To initiate lamp operation in the illustrated embodiment, the switch 27 is closed for a few seconds to heat the filaments at each end of each lamp but, as previously mentioned, other starting arrangements may be provided.

Although the invention has been described herein with reference to a specific embodiment, many modifications and variations therein will readily occur to those skilled in the art. For example, if operation during only the positive or negative half of the input voltage cycle is desired, the corresponding one of the multivibrators 28 and 28' may be eliminated, the resistors 36, 36a or 36', 36a', and 38 and 38a being connected directly to the opposite side of the alternating current input. In addition, the switching components in the circuit may comprise an internally switched solid state device such as a four-layer Shockley diode of the type designated 4E20-8, 4J50-5, or 4J100-5, for example, in place of the illustrated transistors, the Shockley diodes being joined in each multivibrator by appropriate frequency control components such as capacitors. Accordingly, all such variations and modifications are included within the intended scope of the invention as defined by the following claims.

We claim:

1. A multivibrator circuit comprising electronic switch means connected in series with a load across an alternating current source, unidirectional conductor means connected across the switch means and in series with the load, circuit means connected to the switch means for controlling the operation of the switch means at a selected frequency of operation which is different from the frequency of the alternating current source, and output means connected to the switch means to provide an output voltage which varies at the selected frequency.

2. A multivibrator circuit according to claim 1 wherein the circuit means for controlling the operation of the switch means comprises further switch means connected to respond to operation of the first-mentioned switch means and to regulate the operation of the first-mentioned switch means.

3. A multivibrator circuit according to claim 1 wherein the switch means comprises electron valve means effective to control current flow in one direction and the unidirectional conductor means connected in shunt therewith comprises diode means oriented to permit normal current flow in the opposite direction.

4. A multivibrator circuit according to claim 3 wherein the electron valve means comprises a transistor and is connected in series with the output means.

5. A multivibrator circuit according to claim 4 wherein the diode means includes a Zener diode having a reverse voltage breakdown selected in accordance with the forward voltage characteristics of the transistor to prevent excess forward voltage from being supplied thereto.

6. An alternating current frequency converter system comprising first and second multivibrator means connected in series with a load across an alternating current source, the first multivibrator means being effective to produce an output voltage having a selected frequency which differs from the alternating current frequency only during one half of the alternating current cycle, the second multivibrator means being effective to produce an output voltage having a selected frequency which differs from the alternating current frequency only during the other half of the alternating current cycle, unidirectional conductor means connected across each multivibrator means and in series with the load to conduct current during that half of the alternating current cycle when the other multivibrator means is effective to produce an output voltage, and output means connected to both multivibrator means for providing an output voltage having a frequency different from the alternating current frequency during both halves of the alternating current cycle.

7. A high frequency power supply comprising electronic switch means connected in series with a load across an alternating current source, unidirectional conductor means connected across the switch means and in series with the load, circuit means connected to the switch means for controlling the operation of the switch means at a frequency greater than the frequency of the alternating current source, and output means comprising an impedance connected in series with the switching means and across the load.

8. A high frequency power supply according to claim 7 wherein the electronic switch means and the circuit means for actuating the electronic switch means comprises a multivibrator.

9. A high frequency power supply for fluorescent lamps comprising electronic switch means adapted to be connected in series with an impedance means across an alternating current source, unidirectional conductor means connected across the switch means and in series with the impedance means, circuit means connected to the switch means for controlling the operation of the switch means at a frequency greater than the frequency of the alternating current source, and output means including a current limiting impedance element for connecting a fluorescent lamp across the impedance means.

10. A high frequency power supply for fluorescent lamps according to claim 9 including second electronic switch means connected in series with a second impedance means across the alternating current source, the second switch means being connected to and operable in conjunction with the first-mentioned switch means and second output means including a second current limiting impedance element for connecting a second fluorescent lamp across the second impedance means.

References Cited
UNITED STATES PATENTS

| | | | |
|---|---|---|---|
| 2,447,304 | 8/1948 | Atkins | 331—71 |
| 3,141,140 | 7/1964 | Rich | 331—71 |

ROY LAKE, *Primary Examiner.*

JOHN KOMINSKI, *Examiner.*